(12) United States Patent
Scarborough et al.

(10) Patent No.: US 12,205,087 B2
(45) Date of Patent: *Jan. 21, 2025

(54) SYSTEM FOR COMMUNICATING WITH A FINANCIAL INSTITUTION TO MANAGE DISBURSEMENTS OVER A COMMUNICATION NETWORK

(71) Applicant: Bottomline Technologies, Inc., Portsmouth, NH (US)

(72) Inventors: Andrew Scarborough, Reading (GB); Phillip Malone, Stratham, NH (US); Sean Glerum, Dover, NH (US); Sandhya S. Pillalamarri, Acton, MA (US); Melissa Mikulski, Portsmouth, NH (US); William Cashman, Durham, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 841 days.

This patent is subject to a terminal disclaimer.

(21) Appl. No.: 17/393,967

(22) Filed: Aug. 4, 2021

(65) Prior Publication Data

US 2021/0365904 A1    Nov. 25, 2021

Related U.S. Application Data

(63) Continuation-in-part of application No. 16/829,941, filed on Mar. 25, 2020, now Pat. No. 11,094,006.

(51) Int. Cl.
*G06Q 20/10*     (2012.01)
*G06F 3/14*      (2006.01)
*H04L 67/12*     (2022.01)

(52) U.S. Cl.
CPC ............ *G06Q 20/10* (2013.01); *G06F 3/14* (2013.01); *H04L 67/12* (2013.01)

(58) Field of Classification Search
CPC .. G06Q 20/10; G06Q 20/102; G06Q 2220/00; G06Q 20/14; G06Q 20/382;
(Continued)

(56) References Cited

U.S. PATENT DOCUMENTS

| 7,395,243 B1 * | 7/2008 | Zielke ................ G06Q 20/10 705/40 |
| 7,578,434 B2 | 8/2009 | Hansen et al. |

(Continued)

OTHER PUBLICATIONS

Roozbahni, et al., "The Role of E-Payment Tools and E-Banking in Customer Satisfaction case Study: Pasargad Bank E-Payment Company", International Journal of Advanced Networking and Applications 7.2: 2640-2649, Eswar Publications, Sep./Oct. 2015.*

(Continued)

*Primary Examiner* — Frantzy Poinvil
(74) *Attorney, Agent, or Firm* — Downs Rachlin Martin PLLC

(57) ABSTRACT

Disclosed are a system and a method for communicating with a financial institution over a communication network to manage payments of payee initiated by a sender. The system includes a database for storing a plurality of modules, a central server for monitoring and updating the plurality of modules, a processing unit that processes the plurality of modules. The plurality of modules includes a notification module, a payee module, a dashboard module, a refunds module, a payment process module, and a remittance summary module. The notification module allows the sender to send a payment summary to each payee. The payee module allows the payee to upload the payee's details, to select a mode of payment to receive the payment. The payment process module processes the payment as per the mode selected by the payee in the payee module, further processes the payment via cheque mode if the payee fails to update the (Continued)

mode of payment in a pre-defined duration. The remittance summary module displays a summary of the payments made by the sender to the payee.

20 Claims, 12 Drawing Sheets

(58) Field of Classification Search
CPC .. G06Q 20/4014; G06Q 20/407; G06Q 30/04; G06Q 40/02; G06Q 40/12; G06Q 50/01; G06Q 10/10; G06F 3/14; H04L 67/12
USPC ....................................... 705/3–44; 305/3–44
See application file for complete search history.

(56) References Cited

U.S. PATENT DOCUMENTS

| | | | |
|---|---|---|---|
| 7,729,984 B1 * | 6/2010 | Nappi .................... | G06Q 20/10 705/35 |
| 8,630,945 B1 | 1/2014 | Sun et al. | |
| 8,732,078 B1 | 5/2014 | Billman et al. | |
| 9,852,406 B2 | 12/2017 | Doyle et al. | |
| 9,892,460 B1 | 2/2018 | Winklevoss et al. | |
| 10,185,936 B2 | 1/2019 | O'Leary et al. | |
| 10,373,154 B2 | 8/2019 | Kimberg et al. | |
| 2001/0032183 A1 * | 10/2001 | Landry .................. | G06Q 20/14 705/40 |
| 2004/0088251 A1 * | 5/2004 | Moenickheim ........ | G06Q 30/06 705/39 |
| 2004/0139011 A1 | 7/2004 | Kozee et al. | |
| 2006/0206425 A1 | 9/2006 | Sharma | |
| 2006/0259423 A1 * | 11/2006 | Kroetsch ............... | G06Q 40/00 705/40 |
| 2006/0287953 A1 | 12/2006 | Chauhan | |
| 2009/0283585 A1 | 11/2009 | Hansen et al. | |
| 2009/0287601 A1 | 11/2009 | Tumminaro et al. | |
| 2014/0136405 A1 * | 5/2014 | DuCharme ............ | G06Q 20/10 705/40 |
| 2015/0066765 A1 | 3/2015 | Banks et al. | |
| 2015/0324932 A1 * | 11/2015 | McCary, Sr. .......... | G06Q 40/02 705/33 |
| 2015/0371212 A1 | 12/2015 | Giordano et al. | |
| 2016/0071069 A1 | 3/2016 | Skala | |
| 2016/0125373 A1 * | 5/2016 | Chevlin ................. | G06Q 10/10 705/40 |
| 2016/0132884 A1 | 5/2016 | Fridman et al. | |
| 2016/0253639 A1 | 9/2016 | Sharma | |
| 2016/0328711 A1 | 11/2016 | Elischer | |
| 2017/0011460 A1 | 1/2017 | Molinari et al. | |
| 2017/0178110 A1 | 6/2017 | Swanson et al. | |
| 2017/0221066 A1 * | 8/2017 | Ledford ............. | G06Q 20/4016 |
| 2019/0340590 A1 * | 11/2019 | Davey .................. | G06Q 20/108 |
| 2021/0012318 A1 * | 1/2021 | Ducoulombier ... | G06Q 20/3278 |

OTHER PUBLICATIONS

Bhatt et al., A Study of Customer Perception toward Digital Banking Payments, International Journal of Banking, Risk and Insurance 11(2) 2023, 26-31 (Year: 2023).*

Humphrey et al., "Cash, paper, and electronic payments: a cross-country analysis", Journal of Money, Credits. Banking 28.n4: p914(28). Ohio State University Press, ISSN: 0022-2879, Nov. 1996.

Mastercard Send(Trademark), Powering a faster, better, smarter way to send money, domestically and cross-border, https://mastercard.us/en-us/issuers/products-and-solutions/customer-needs/consumer-solutions/mastercardsend.html, US,,webpage downloaded on Mar. 25, 2020.

PayM, https://paym.co.uk/, UK, webpage downloaded on Mar. 25, 2020.

Visa, https://www.visa.eom.bs/partner-with-us/payment-technology/visa-direct-funds-disbursements.html, US, webpage downloaded on Mar. 25, 2020.

* cited by examiner

FIG. 7

SYSTEM FOR COMMUNICATING WITH A FINANCIAL INSTITUTION TO MANAGE DISBURSEMENTS OVER A COMMUNICATION NETWORK

BACKGROUND OF THE INVENTION

1. Field of the Invention

The present invention generally relates to a system for communicating with a financial institution, and more particularly relates to a system for communicating with a financial institution to manage disbursements over a communication network.

2. Description of Related Art

The international markets for United States manufacturers, traders, and exporters have grown tremendously in recent years, and this growth has principally been fueled by new technology. Such growth has also included the development of new and varied distribution channels.

All of this has placed a great strain on existing finance methods and account payable (AP) departments to deal with accounts-receivable problems, particularly for companies who need to make large numbers of one-time payments. For years companies have been trying to move transactions into an electronic system.

The accounts-receivable department of a company has to undergo a tedious task to set up payment information and reconcile all pending transactions and confirm the same with the financial institutions/credit unions.

Even though many attempts have been made to reduce the amount of labor required to process the payments manually, the above process remains labor-intensive and therefore costly. Further, the existing applications failed to produce a dashboard for showcasing a summary of payment types along with their current payment status.

Therefore, there is a need for a system that quickly and conveniently makes payments. The system should be able to automatically manage payments of a payee to be sent by a sender (the sender could be an individual, a company, a corporation, a government, etc.). The system should reduce the involvement of the sender to release payments of the payee. The present inventions offer a vast improvement over existing payment systems and methods.

SUMMARY OF THE INVENTION

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed. Other objects, advantages, and novel features according to aspects of the inventions will become apparent from the following detailed description when considered in conjunction with the drawings.

An object of the present inventions is to provide a system for communicating with a financial institution over a communication network to manage payments of payee initiated by a sender.

The system includes a database for storing a plurality of modules, a central server for monitoring and updating the plurality of modules, a processing unit coupled to the database, and the financial institution through the central server for processing the plurality of modules. The plurality of modules includes a notification module, a payee module, a dashboard module, a refunds module, a payment process module, and a remittance summary module.

The notification module allows the sender to send a payment summary to each payee. The payee module allows the payee to upload the payee's details in the central server, further allows the payee to select a mode of payment to receive the payment, furthermore allows the payee to input banking details of the financial institution.

The payment process module processes the payment as per the mode selected by the payee in the payee module, further processes the payment via cheque mode if the payee fails to update the mode of payment in a pre-defined duration.

Another object of the present invention is to provide the system with a customizable payment summary template module for allowing the sender to customize the format of the payment summary, a verification payee account module for verifying the identification of the payee's details added through the payee module and a logo module for allowing the sender to add a logo on the payment summary.

Another object of the present invention is to provide the system wherein the notification module allows the sender to send payment summary of each payee to the financial institution to initiate the payments, and a financial institution module allows the financial institution to process the payments as per the mode selected by the payee in the payee module.

Another object of the present invention is to provide the system with a reminder module coupled to the notification module to send follow-up notifications to the payee to select the mode of payment, and an encryption module for encrypting the banking details provided by the payee in the payee module.

Another object of the present invention is to provide the system with an account verification module coupled with the payee module for confirming the payee banking details with details of the payee held by the financial institution, and a payment status module coupled to the payment process module for sending updates on the status of payments to the payee via the communication network.

Another object of the present invention is to provide the system with a registration module for registering at least one of: at least one sender; and at least one payee, on the central server, and a preferred payment module for analyzing at least one of: phone text messages; and social media accounts, to detect the preferred mode of payment of the payee.

Another object of the present invention is to provide the system with a refunds module for allowing the sender to receive refunds of the payment sent to the payee, and a dashboard module to display payment method activities, allows the sender to search for payments, and allows the sender to track outgoing payments.

BRIEF DESCRIPTION OF DRAWINGS

The annexed drawings, which are not necessarily to scale, show various aspects of the inventions in which similar reference numerals are used to indicate the same or similar parts in the various views.

FIG. 7 illustrates a screenshot viewing of a graphical user interface for the refunds module;

DETAILED DESCRIPTION OF DRAWING

Figure 1:
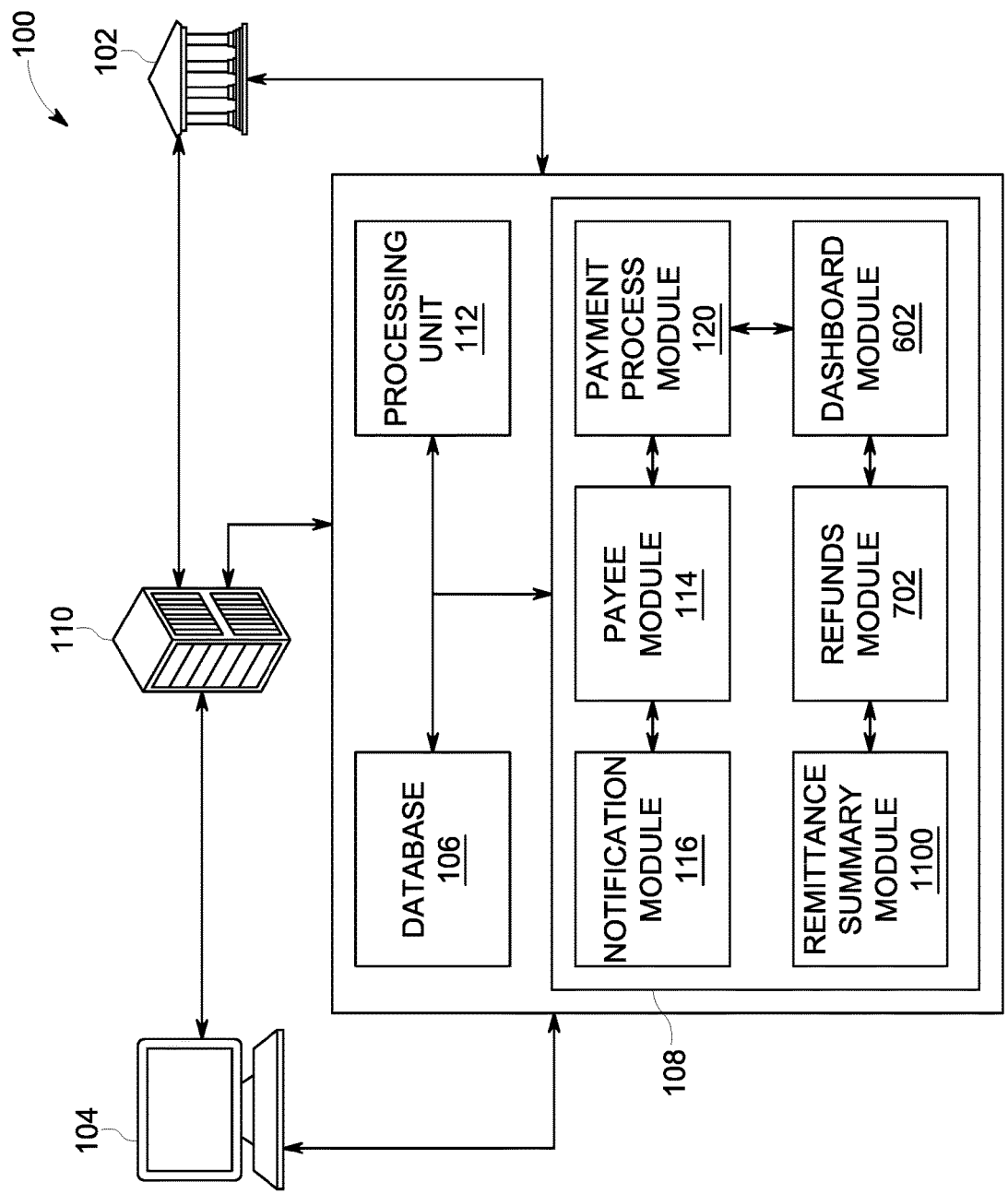
FIG. 1 illustrates a schematic diagram of a system communicating with a financial institution over a communication network to manage payments of payee initiated by a sender.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention relates to the transferring of payments to one or more payees by a sender using the software. The software sends a payment summary to the payee. The payee/sender then sends banking details and the preferred mode of payment to receive the payment(s). The software then processes the payment automatically as per the preferred mode of payment.

FIG. 1 illustrates a schematic diagram of a system 100 communicating with a financial institution 102 over a communication network to manage payments of payee initiated by a sender using a sender computing device 104. The system 100 includes a database 106 for storing a plurality of modules 108, a central server 110 for monitoring and updating the plurality of modules 108, and a processing unit 112 coupled to the database 106 and the financial institution 102 through the central server 110 for processing the plurality of modules 108. In a preferred embodiment, the central server 110 is a cloud-based server.

The plurality of modules 108 include a payee module 114, a notification module 116, a dashboard module 602, a refunds module 702, a payment process module 120, and a remittance summary module 1100. The notification module 116 allows the sender to send a payment summary to each payee over the communication network. Examples of the sender include but are not limited to insurance companies, companies, factories, higher education, institutions, healthcare providers, commercial real estate providers, etc.

A payee could be an individual, a small business, or a company that does not routinely receive payments from the sender. For instance, an insurance company, the sender, could make payments to claimants who rarely receive a claim payment. Another example is utilities who are required by law to make refunds to customers when the utility does not provide the service. Still another example is a class action litigation manager, who needs to make a large number of one-time payments to a large number of claimants.

The payee module 114 displays the payment summary to the payee. Further, the payee module 114 allows the payee to upload the payee's details in the central server 110. The payee module 114 further allows the payee to input banking details of the financial institution.

In another embodiment of the present invention, the payee provides banking details via tokenization e.g. payment transaction mobile applications such as Zelle. It would be readily apparent to those skilled in the art that various modes of input of banking details by the payee may be envisioned without deviating from the scope of the present invention.

Furthermore, the payee module 114 allows the payee to select a mode of payment to receive the payment. The notification module 116 and the payee module 114 are explained in detail in conjunction with FIG. 2 and FIGS. 3A & 3B, respectively of the present invention.

The dashboard module 602 is coupled to the payee module for allowing the sender to receive a funds request from the sender for the payments send to the payee. The refunds module 702 is coupled to the dashboard module 602 for allowing the sender to receive funds of the payment sent to the payee. The dashboard module 602 and the refunds module 702 are explained in detail in conjunction with FIG. 6A, 6B, and FIG. 7 respectively.

The payment process module 120 processes the payment as per the mode selected by the payee in the payee module 114. Further, the payment process module 120 processes the payment via cheque (alternatively may be referred to as a check) mode if the payee fails to update the mode of payment in a pre-defined duration. The payment process module 120 is explained in detail in conjunction with FIG. 4 of the present invention.

In another embodiment of the present invention, it would be readily apparent to those skilled in the art that the sender may also cancel the payment request, in case the payee fails to select a mode of payment within a pre-defined time period. In another embodiment of the present invention, it would be readily apparent to those skilled in the art that the system may automatically cancel the payment request on behalf of the sender based on a pre-configured setting if so desired, in case the payee fails to select a mode of payment within a pre-defined time period.

In another embodiment of the present invention, the plurality of modules further includes a customizable payment summary template module, a verification module, a logo module, a financial institution module, a reminder module, an encryption module, an account verification module, a payment status module, a registration module, a preferred payment module, a refunds module, and a dashboard module.

In another embodiment of the present invention, the notification module 116 allows the sender to send the payment summary of each payee to the financial institution to initiate the payments. The financial institution module allows the financial institution to process the payments as per the mode selected by the payee in the payee module. It would be readily apparent to those skilled in the art to envision financial institutions as banks, credit unions, member-owned financial cooperatives, FinTech companies, etc. without deviating from the scope of the present invention.

The encryption module encrypts the banking details provided by the payee in the payee module 114. The account verification module is coupled with the payee module 114 for confirming the payee banking details with the details of the payee held by the financial institution. The central server 110 sends the banking details to the financial institution to confirm the payee details. The registration module (not shown in FIGURES) registers sender and payee, on the central server 110. The plurality of modules are explained in detail in conjunction with FIG. 2 to FIG. 7 of the present invention.

Figure 2:
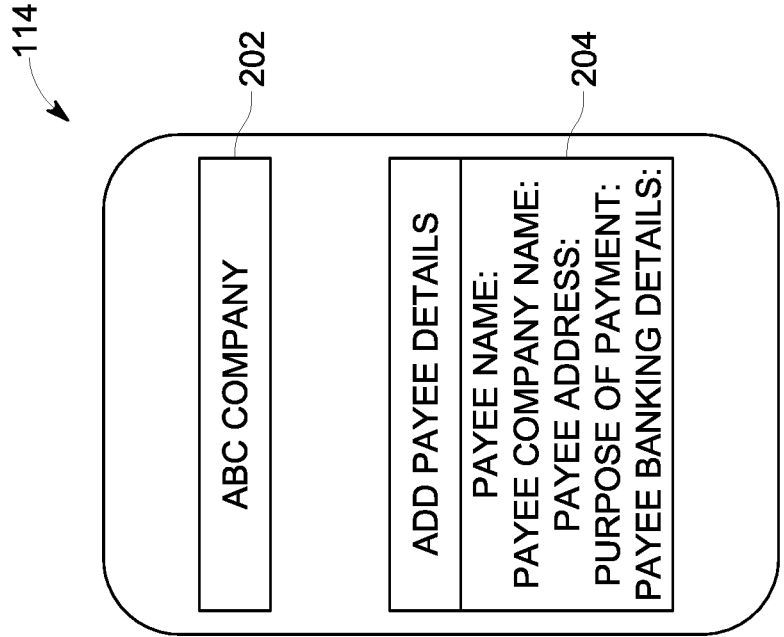
FIG. 2 illustrates a schematic diagram of the payee module in an exemplary embodiment of the present invention.

FIG. 2 illustrates a schematic diagram of the payee module 114 in an exemplary embodiment of the present invention. The payee module 114 displays sender information 202 including but not limited name of the sender, address of the sender, tax ID of the sender, etc.

The payee module 114 allows the payee to add payee details 204 related to how the payee would prefer to receive a payment, including but not limited to payee name, payee company name and address, purpose of payment, payee banking details, user ID, and password, etc. The payment summary (304, shown in FIG. 3) is generated automatically by the central server and is sent by the notification module 116.

Further in another embodiment of the present invention, the payment summary (304, shown in FIG. 3) is customized as per the likings of the sender through the customizable payment summary template module (not shown in FIGURES). It would be readily apparent to those skilled in the art that various types of customization depending upon the requirement of the sender such as different phone numbers for different disbursements may be envisioned without deviating from the scope of the present invention. In some embodiments, the remittance summary module is the payment summary template module.

Further, the sender may add a logo (e.g. company's logo) in the payment summary through the logo module (not shown in FIGURES). The logo may help the payee to recognize or confirm the sender of the payment Further, the logo module may include details of the phone number and email address of the sender. It would be readily apparent to those skilled in the art that various types of logos may be envisioned to differentiate different types of disbursements of the payments without deviating from the scope of the present invention.

The notification module 116 allows the sender to send the payment summary (304, shown in FIG. 3A) over the communication network. In an embodiment of the present invention, the sender sends the payment summary through Email. However, it would be readily apparent to those skilled in the art that various other means for communication such as SMS, Whatsapp, Hike, other similar social media platforms, etc. may be envisioned without deviating from the scope of the present invention.

Figure 3B:
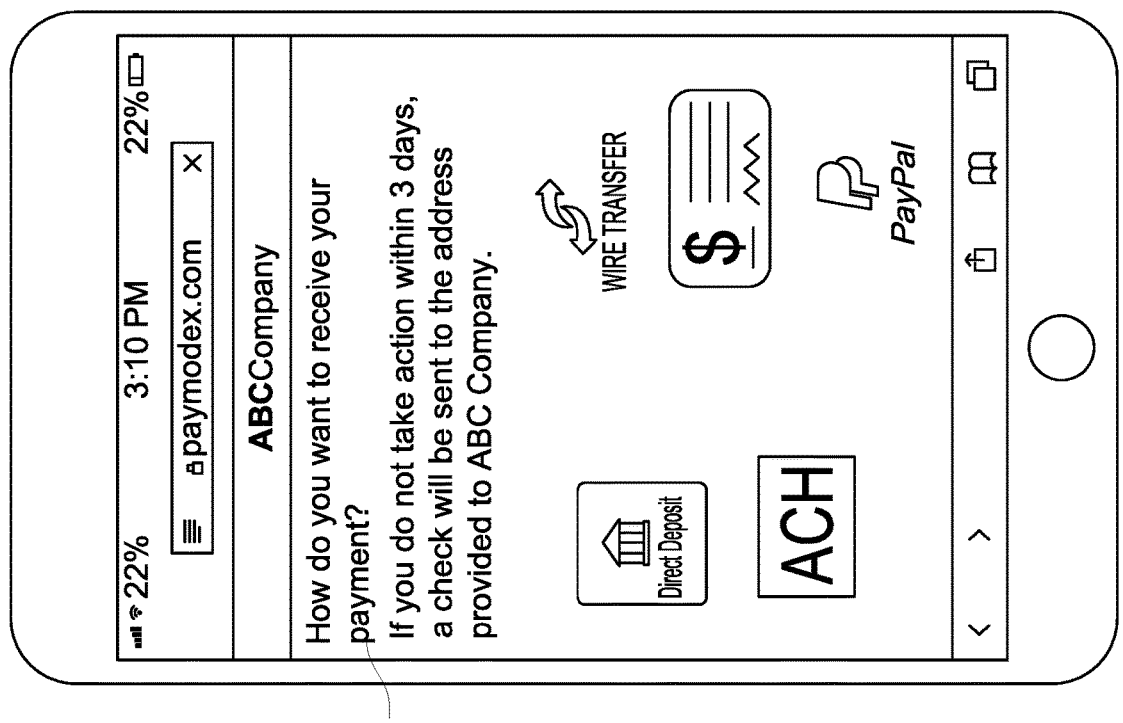
FIG. 3B illustrates another screenshot viewing of a graphical user interface for the payee module showing modes for receiving the payments.
Figure 3A:
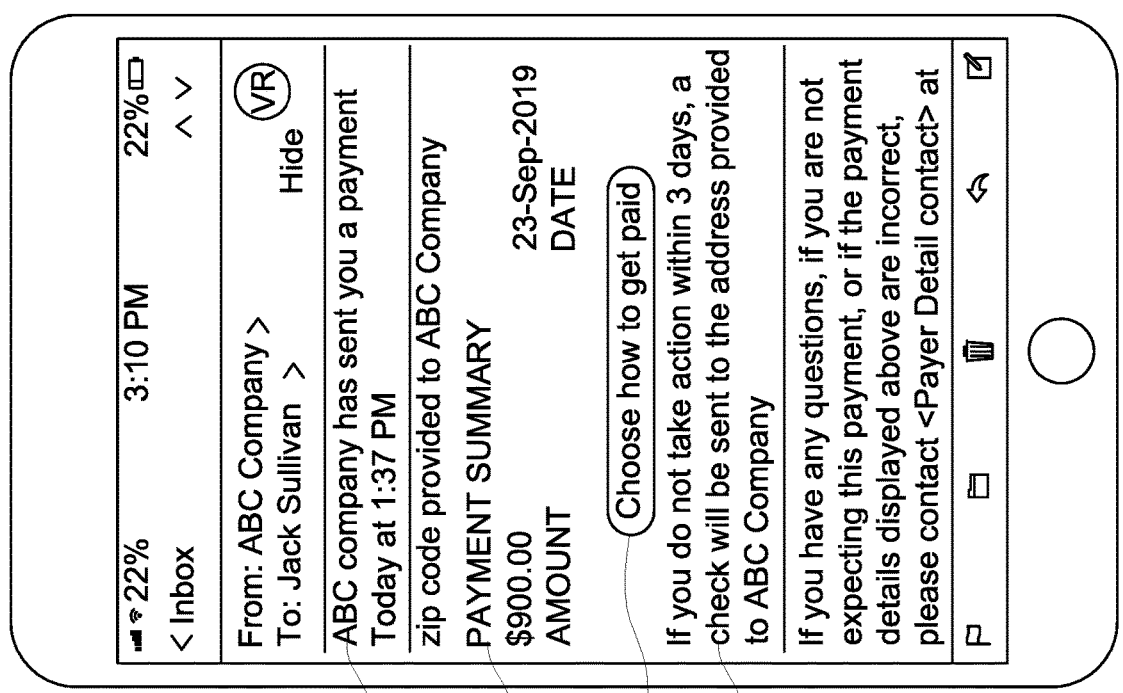
FIG. 3A illustrates a screenshot viewing of a graphical user interface for the payee module.

FIG. 3A illustrates a screenshot viewing of a graphical user interface for the payee module 114. The payee module 114 displays the payment summary 304 to the payee and further allows selecting a mode of payment 302 to receive the payment in the provided banking details. FIG. 3B illustrates another screenshot viewing of a graphical user interface for the payee module 114 showing modes 302 for receiving the payments. Examples of the mode to receive the payments include but are not limited to direct deposit, wire transfer, ACH, debit card, cheque/checks, etc. The system is configurable to cater to varying payment types as desired by a sponsoring sender.

Figure 4:
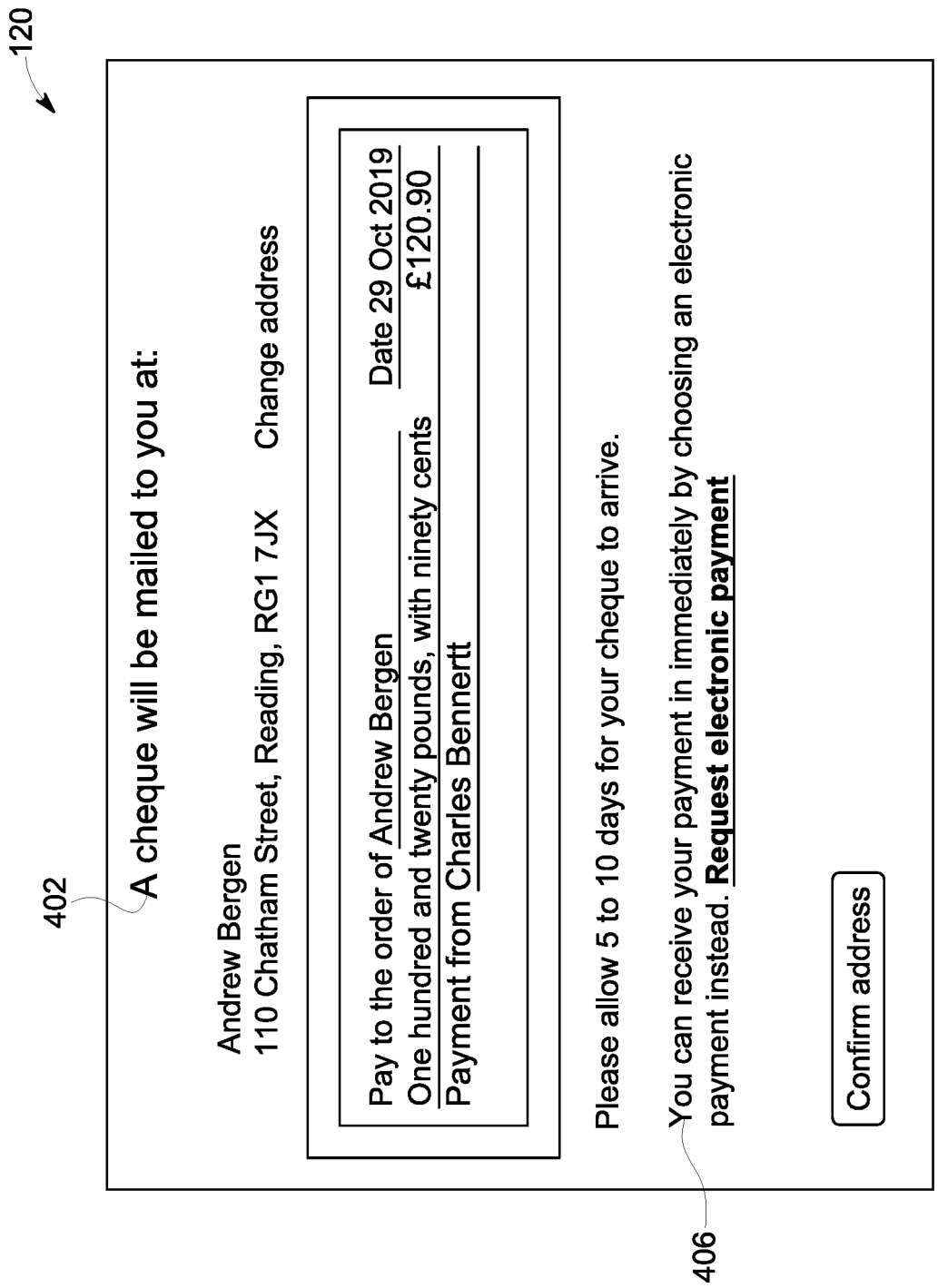
FIG. 4 illustrates a screenshot viewing of a graphical user interface for the payment process module.

FIG. 4 illustrates a screenshot viewing of a graphical user interface for the payment process module 120. The payment process module 120 processes the payment as per the mode selected by the payee in the payee module (114, shown in FIG. 3A). In an exemplary embodiment, the payee selects cheque/check as a mode of payment in the payee payment module. Then as shown in FIG. 4, the payment process module 120 processes the payment via cheque 402.

It would be readily apparent to those skilled in the art that payment process module 120 processes the payment as per the mode selected in the payee module 114. Hence, the payment process module 120 may process the payment via electronic means such as ACH, PayPal, Debit, Wire-transfer, direct deposit, cards, etc, depending upon the mode selected by the payee.

The payment process module 120 further processes the payment via cheque if the payee fails to select the mode of payment within a pre-defined time. In an embodiment of the present invention, the pre-defined duration is 3 days, however, it would be readily apparent to those skilled in the art that various duration (number of days) may be configured without deviating from the scope of the present invention.

A reminder is sent to the payee at regular intervals to select a mode of payment via the reminder module (not shown in FIGURES). The reminder may be sent via email, SMS, internet messages, etc. The duration of intervals may be customized such as 1 message in each day or 2 messages in each day or 'n' messages in each day. It would be readily apparent to those skilled in the art that various modes and intervals of reminder may be envisioned without deviating from the scope of the present invention.

The payee module (114, as shown in FIG. 3A) displays instructions 404 for releasing the payment within a pre-defined duration. The payment process module 120 further displays another instruction 406 to receive payments electronically to receive payments immediately.

The payment status module (not shown in FIGURES) is coupled to the payment process module 120 for sending updates on the status of payments to the payee via the communication network. For example, the payment status module may send status in numerous ways such as but not limited to the number of days in which the payment would be credited in the provided banking details, the number of days left to receive the cheque/check, etc.

Figure 5:
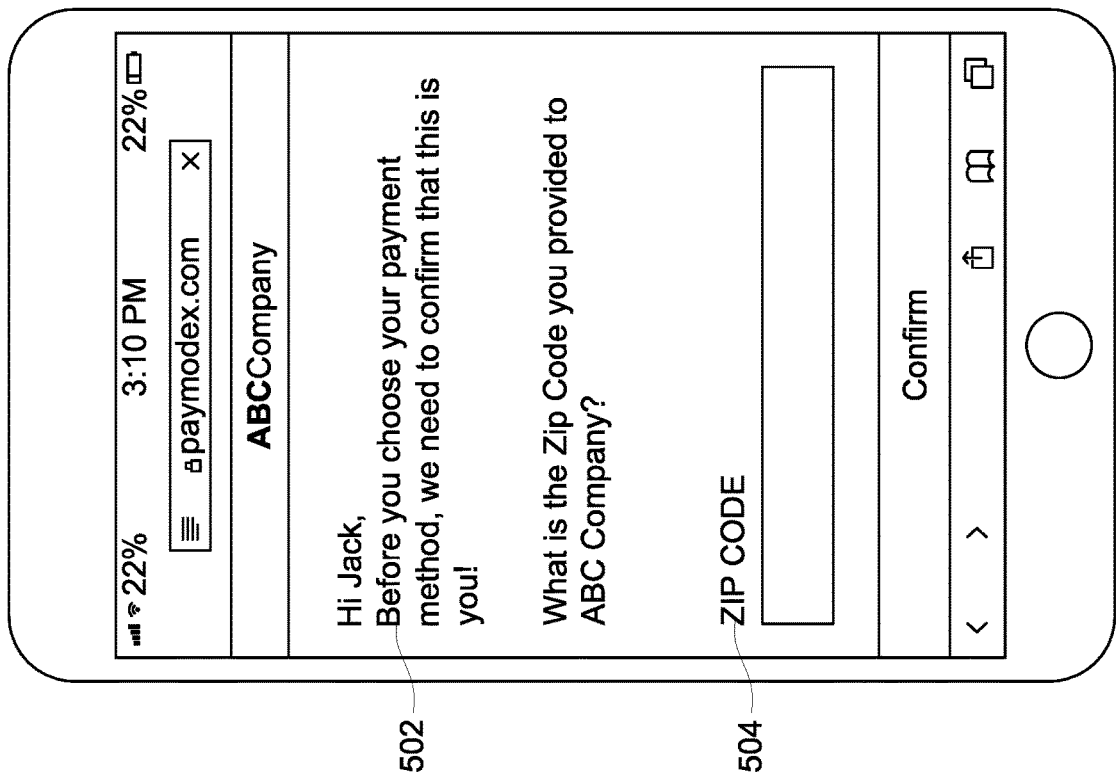
FIG. 5 illustrates a screenshot viewing of a graphical user interface for a verification payee account module.

FIG. 5 illustrates a screenshot viewing of a graphical user interface for the verification payee account module 502. The verification payee account module 502 verifies the identification of the payee before allowing to choose a mode of payment. The verification may be done by asking questions such as but not limited to postal code 504 (postal code is a ZIP Code in the USA). In another embodiment of the present invention, the verification options such as shared secrets including but are not limited to a utility account numbers, a social security number (all or a portion of the number), a driver's license number, a phone number, insurance claim number, student identification number or other means for verifying the payee identification.

It would be readily apparent to those skilled in the art that various questions may be envisioned to ensure verification of payee before releasing the payments by the sender to verify the payee without deviating from the scope of the present invention.

Figure 6A:
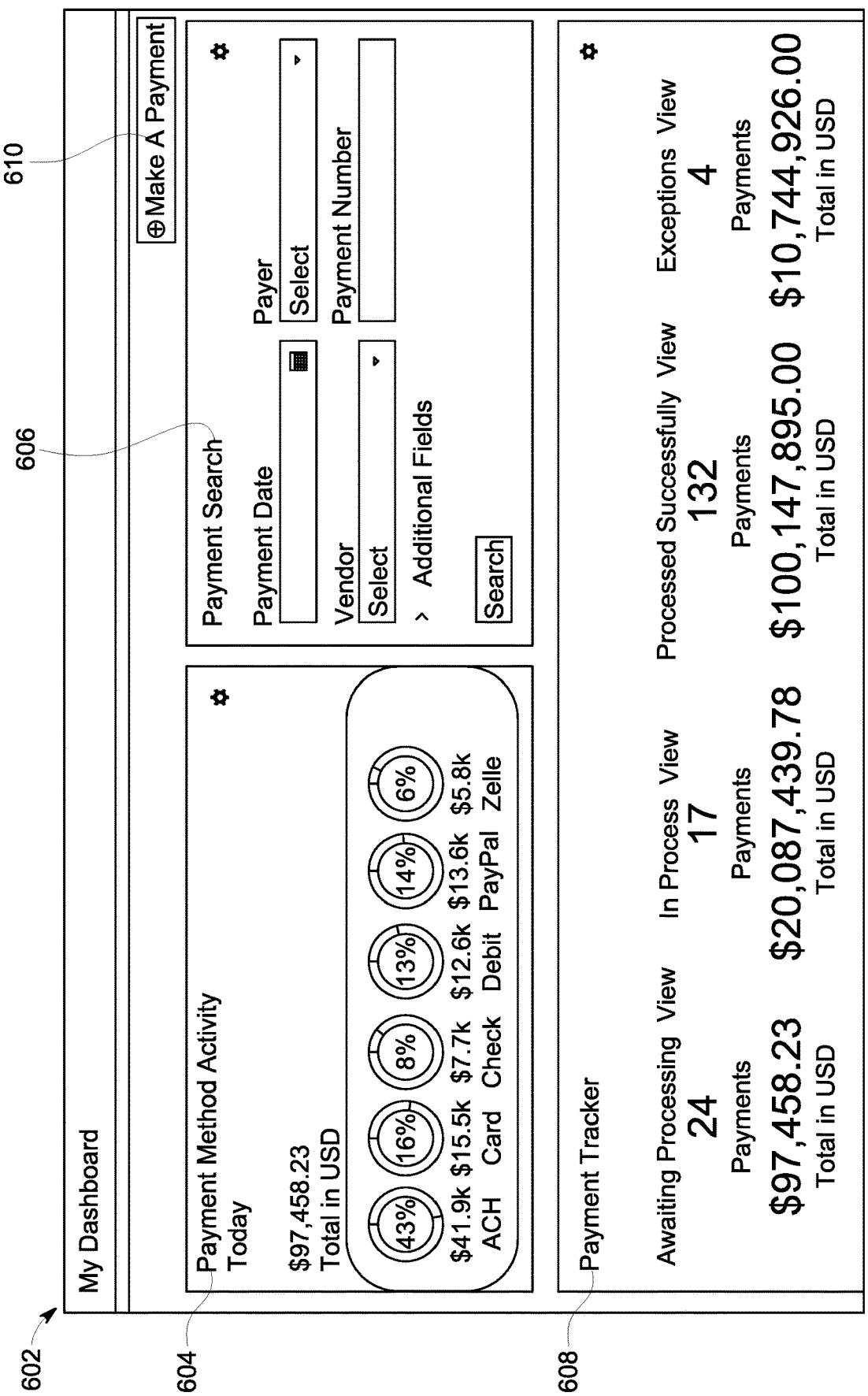
FIG. 6A illustrates a screenshot viewing of a graphical user interface for a dashboard module.

FIG. 6A illustrates a screenshot viewing of a graphical user interface for the dashboard module 602 for informing the sender of the status of the payments. The dashboard module 602 displays payment method activities 604, allows the sender to search 606 for payments and allows the sender to track outgoing payments 608. The payment method activities 604 shows the total payments released in a particular time frame such as the current day or a configurable timeframe. Further, the payment method activities 604 show segregation of payments made by either ACH, Card, Check, Debit, PayPal, Zelle, or other payment types desired by the sender.

The payment search 606 allows the sender to search for payments using various parameters such as payment date, payer, vendor, payment number, etc. The payment tracker 608 allows the sender to view payments in their current payment status such as awaiting processing, in-process, processed successfully, and exceptions. Further, the dashboard module 602 allows the sender to make new payments 610.

Figure 6B:
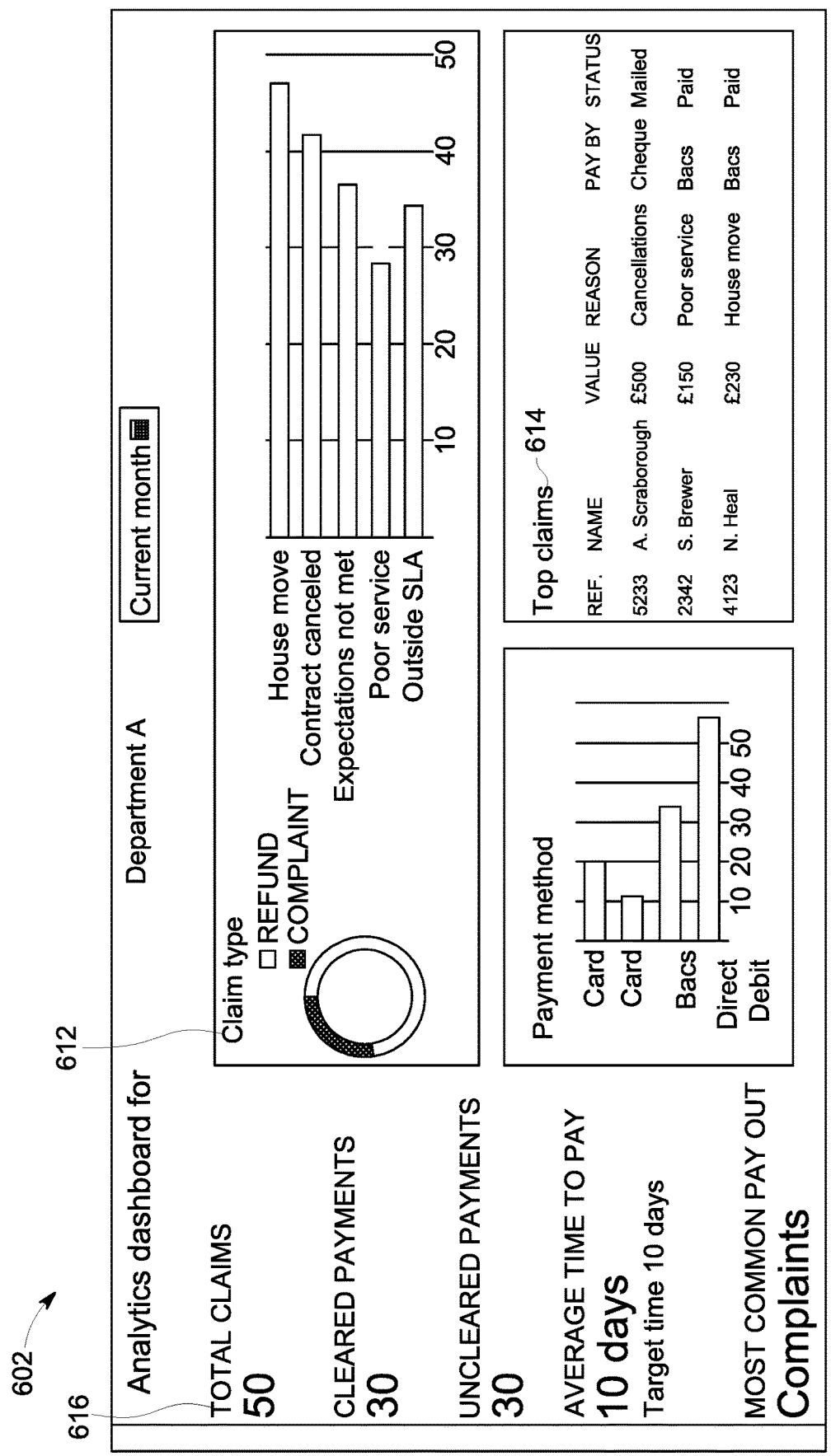
FIG. 6B illustrates another screenshot viewing of a graphical user interface for the dashboard module.

FIG. 6B illustrates another screenshot viewing of a graphical user interface for the dashboard module 602 for reviewing refunds request from the sender for the payments send to the payee, as in the utility example above. The dashboard module 602 allows the sender to check claim type 612, top claims 614, and summary of claims 616.

The claim type 612 indicates that the claim initiated by the sender is a refund or a complaint. The top claims 614 shows the list of top payees from which the request of refunds is initiated. The summary of claim 616 shows the total number of claims, cleared payments, un-cleared payments, average time to pay, most common disbursements, etc.

Figure 7:
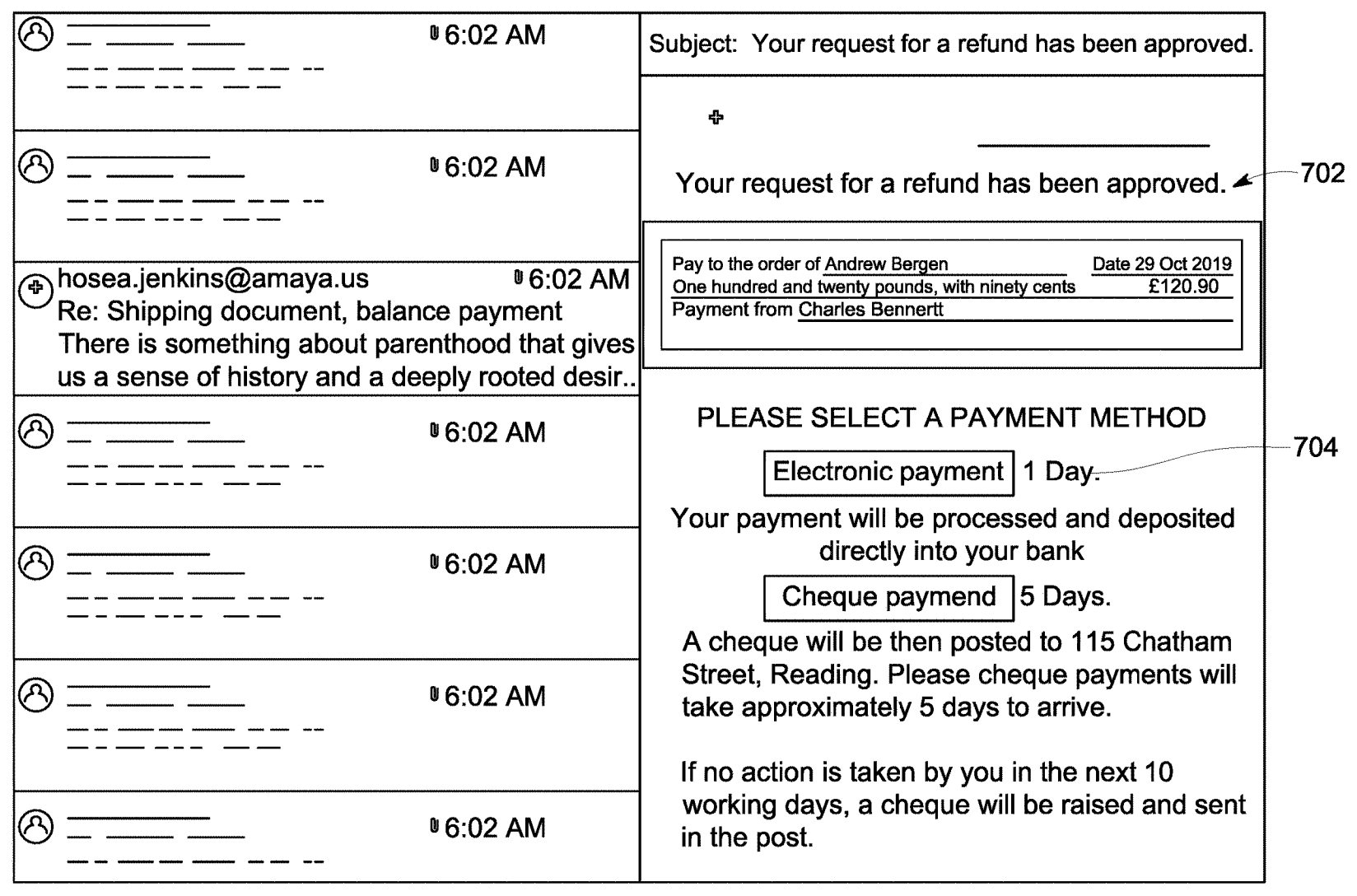

FIG. 7 illustrates a screenshot viewing of a graphical user interface for the refunds module 702. The refunds module 702 allows the sender to receive refunds of the payment sent to the payee. The refunds module 702 allows the sender to select the payment method 704 to receive a refund.

Figure 8B:
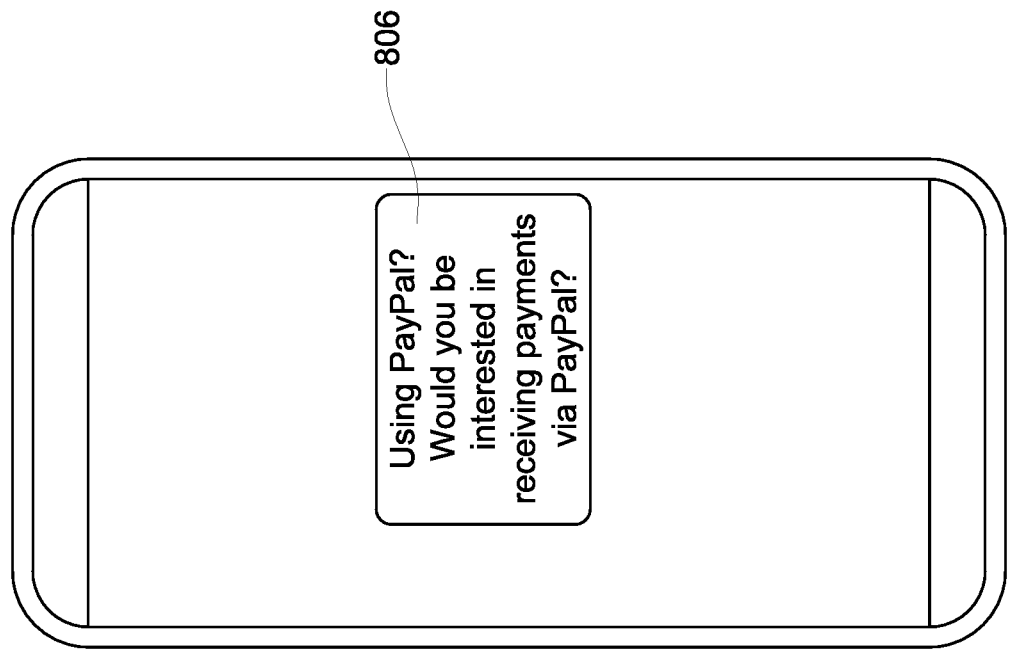
FIG. 8B is another screenshot showing a graphical user interface of the preferred payment module.
Figure 8A:
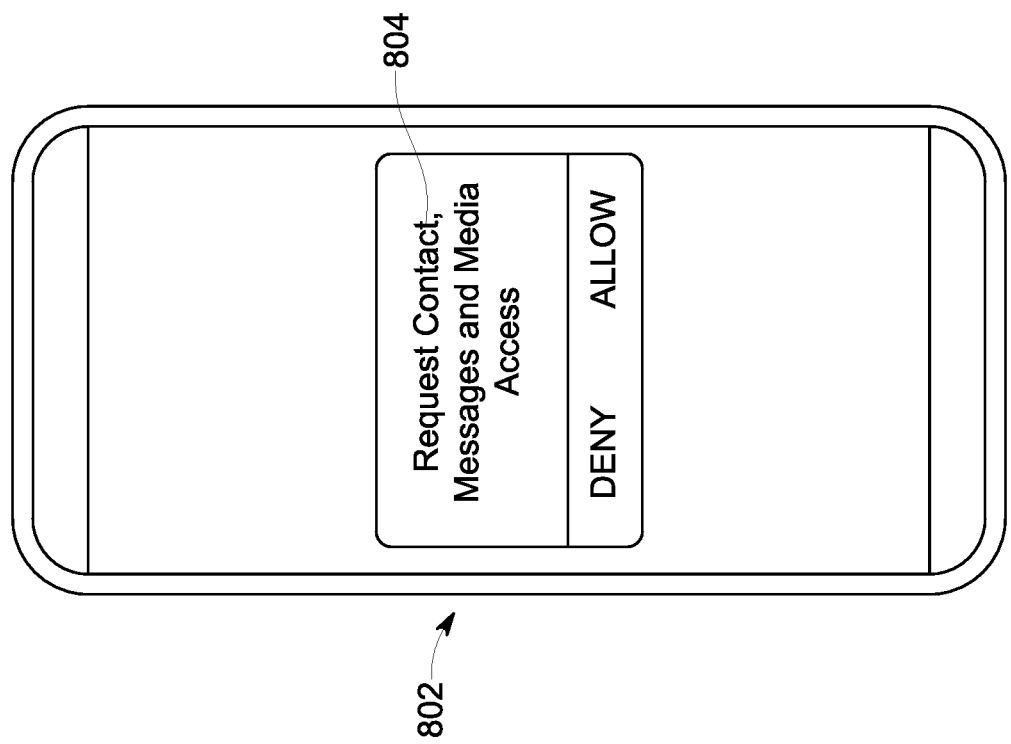
FIG. 8A is a screenshot showing a graphical user interface of the preferred payment module.

FIG. 8A is a screenshot showing a graphical user interface of the preferred payment module 802. The preferred payment module 802 requests access 804 to contacts, SMS, media access, and media files of the payee. The preferred payment module 802 analyzes either phone text messages; and social media accounts, to detect the preferred mode of payment of the payee.

For exemplary purposes, the preferred payment module 802 seeks a request to access the contact list, messages, social media accounts stored in the payee's communicating device at the time of registering the payee on the central server. The preferred payment module 802 extracts preferred mode of payments such as PayPal by analyzing the common mode of receiving payments in the payee communicating device.

FIG. 8B is another screenshot showing a graphical user interface of the preferred payment module 802. The preferred payment module 802 further displays a message 806 to the payee communicating device indicating the mobile application used by the payee to receive payments and suggesting the payee opt for the preferred mobile application to receive the payments.

Figure 9:
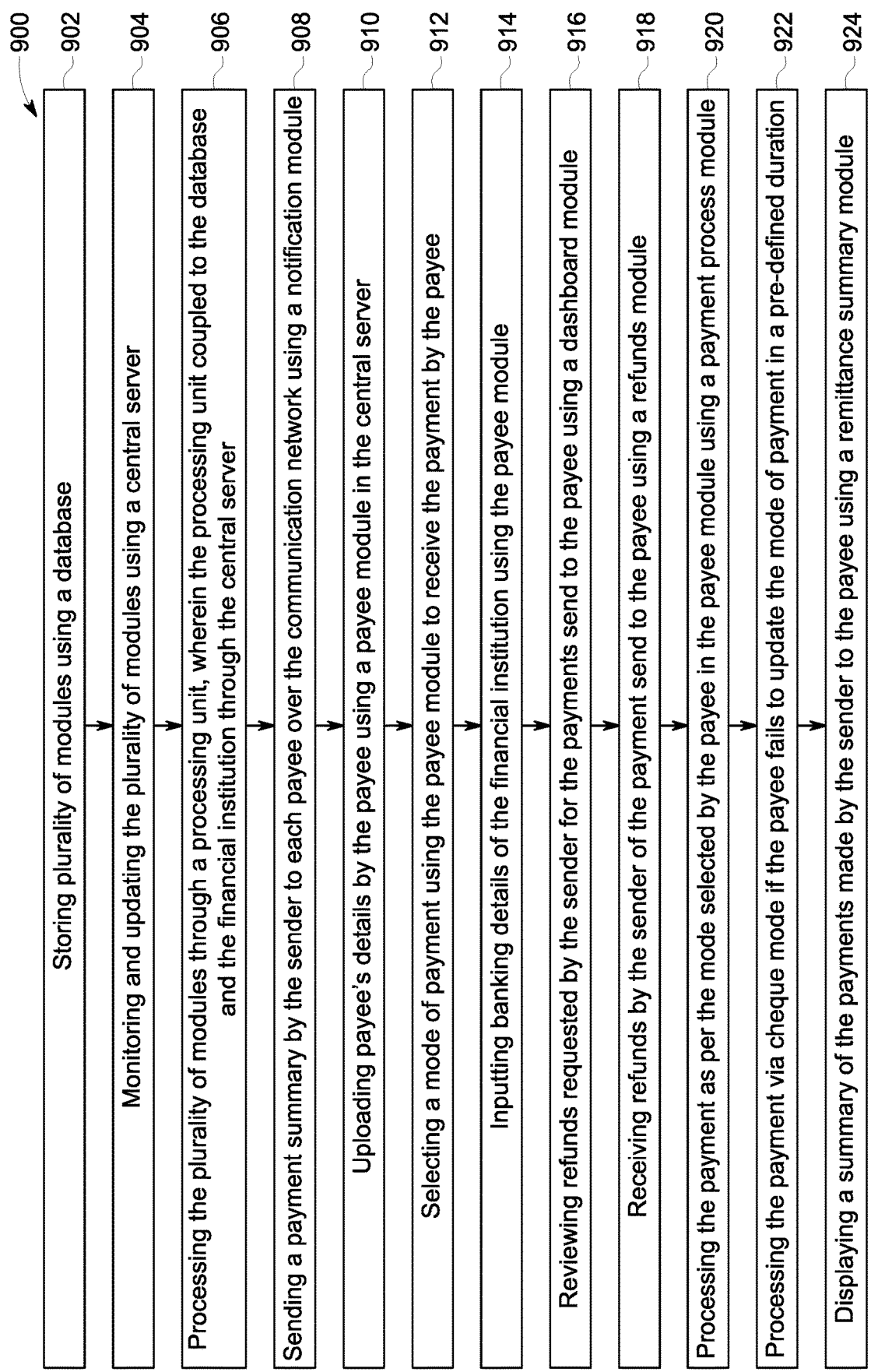
FIG. 9 illustrates a flowchart of a method for communicating with a financial institution over a communication network to manage payments of payee initiated by a sender.

FIG. 9 illustrates a flowchart of a method 900 for communicating with a financial institution over a communication network to manage payments of payee initiated by a sender. The method 900 initiates with a step 902 of storing a plurality of modules using a database. The step 902 is followed by a step 904 of monitoring and updating the plurality of modules using a central server.

The step 904 is then followed by a step 906 of processing the plurality of modules through a processing unit, wherein the processing unit is coupled to the database and the financial institution through the central server. The step 906 is then followed by a step 908 of sending a payment summary by the sender to each payee over the communication network using a notification module.

The step 908 is then followed by a step 910 of uploading the payee's details by the payee using a payee module in the central server. The step 910 is then followed by a step 912 of selecting a mode of payment using the payee module to receive the payment by the payee.

The step 912 is then followed by a step 914 of inputting banking details of the financial institution using the payee module. The step 914 is then followed by a step 916 of reviewing refunds requested by the sender for the payments send to the payee using a dashboard module. The step 916 is then followed by a step 918 of receiving refunds by the sender of the payment send to the payee using a refunds module.

The step 918 is then followed by a step 920 of processing the payment as per the mode selected by the payee in the payee module using a payment process module. The step 920 is then followed by a step 922 of processing the payment via cheque mode if the payee fails to update the mode of payment in a pre-defined duration.

The step 922 is then followed by a step 924 of displaying a summary of the payments made by the sender to the payee using a remittance summary module. The remittance summary module 1100 is explained in detail in conjunction with FIG. 11 of the present invention.

In another embodiment of the present invention the method 900 further includes step of customizing the format of the payment summary using a customizable payment summary template module, and adding a logo on the payment summary using a logo module.

In another embodiment of the present invention, the method 900 further includes the step of verifying identification by using shared secrets of the payee's details added through the payee module using a verification payee account module; sending follow up notification to the payee to select the mode of payment using a reminder module; confirming the payee banking details with the details of payee held by the financial institution using an account verification module; and sending updates on the status of payments to the payee via the communication network.

In another embodiment of the present invention, the method 900 further includes the steps of sending payment summary of each payee added through the payee module for payments to the financial institution using the notification module; and processing the payments as per the mode selected by the payee in the payee module using a financial institution module.

In another embodiment of the present invention, the method 900 further includes the steps of analyzing at least one of: phone text messages; and social media accounts, to detect the preferred mode of payment of the payee using a preferred payment module, and displaying payment method activities, allows the sender to search for payments, and allows the sender to track outgoing payments using a dashboard module. The method 900 is explained in detail in conjunction with FIG. 1 to FIG. 8B of the present invention.

Figure 10:
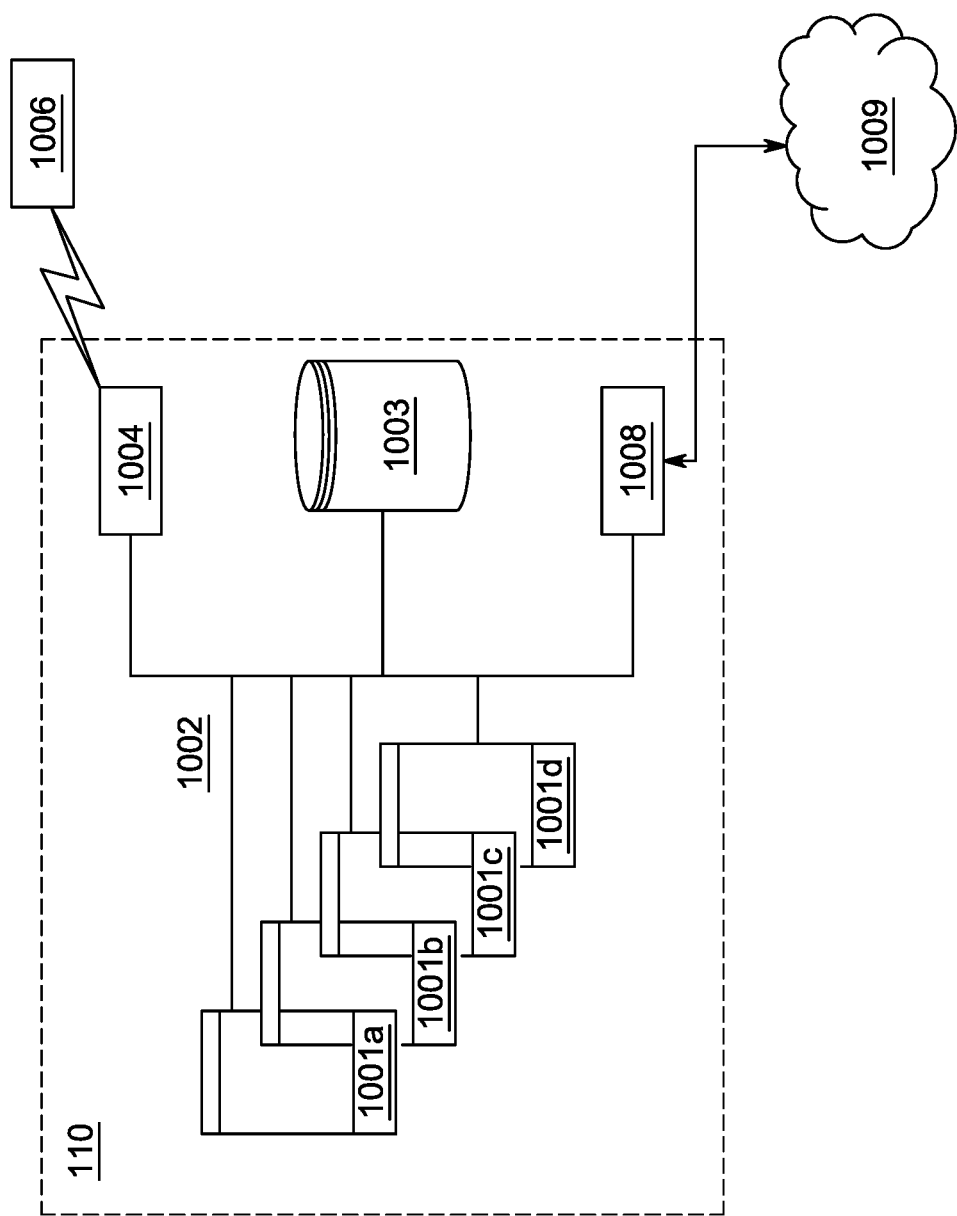
FIG. 10 illustrates a block diagram of an electrical diagram of a central server in accordance with an embodiment of the present invention.

FIG. 10 illustrates a block diagram of an electrical diagram of a central server 110 in accordance with an embodiment of the present invention. Since this software solution is required to handle a large volume of transactions with near real-time performance, a typical computer is not sufficient to perform the tasks. A processing device with a plurality of cores 1001*a*-*d* electrically or optically connected to a bus 1002 is used to handle the performance requirements.

A high speed data storage device 1003, a datastore, with solid state, optical or magnetic media, is electrically or optically connected to the bus 1002. The bus 1002 may be an electrical or optical bus, configured either serially or in parallel. The bus 1002 is also connected to a rail interface 1004 for connection to the banking rail 1006 and to a network interface 1008, the network interface 1008 interfacing to the internet 1009. The network and rail interfaces 1004, 1006 are high performance interfaces and may be combined into a single network interface in some embodiments. In some embodiments, the banking rail 1006 could be replaced with a payment rail or a card rail.

Figure 11:
FIG. 11 illustrates a screenshot showing a remittance summary module in accordance with an exemplary embodiment of the present invention.

FIG. 11 illustrates a screenshot showing of a remittance summary module 1100. The remittance summary module 1100 displays a summary of the payments made by the sender/payer to the payee. The payment summary shows various categories of the payments. Examples of the categories include but not limited to a Company Name, Vendor #, PO #, Contract #, Invoice #, Invoice Date, Original Invoice Amount, Paid Invoice Amount, Discount Amount, Comments, etc.

For exemplary purposes as shown in FIG. 11, invoice # is '15656', invoice date is '26.5.21', and invoice amount is '1546.00'. The payment summary is customizable 1102 to allow the payor/sender to customize the categories displayed in the payment summary. The customization may be done by selecting/deselecting the categories. Further, the payment summary module 1100 allows the sender to rename/add/remove the categories.

In an exemplary embodiment where a payer is in logistic business, is able to edit the categories into field names like: truck number, ticket, customer, product description, date, quantity, rate, UoM, extended, etc. It would be readily apparent to those skilled in the art that various types and number of fields may be created depending upon the nature of industry or business without deviating from the scope of the present invention.

It should be appreciated that many of the elements discussed in this specification may be implemented in a hardware circuit(s), a circuitry executing software code or instructions that are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A system for communicating with a financial institution over a communication network to manage payments of payee initiated by a sender, the system comprising:
   a database for storing a plurality of modules;
   a central server for monitoring and updating the plurality of modules;
   a processing unit coupled to the database and the financial institution through the central server for processing the plurality of modules, wherein the plurality of modules comprising:
      a notification module allows the sender to send a payment summary to each payee over the communication network;
      a payee module displays the payment summary to the payee and further allows the payee to upload payee's details in the central server, further the payee module allows the payee to select a mode of payment to receive the payment, further the payee module allows the payee to input banking details of the financial institution;
      a dashboard module coupled to the payee module for allowing the sender to review refunds requested from the sender for the payments send to the payee;
      a refunds module coupled to the dashboard module for allowing the sender to receive the refunds of the payment send to the payee; and
      a payment process module processes the payment as per the mode selected by the payee in the payee module, further the payment process module processes the payment via cheque mode if the payee fails to update the mode of the payment in a predefined duration; and
      a remittance summary module for displaying a summary of the payments made by the sender to the payee.

2. The system according to claim 1 wherein the plurality of modules further comprising a customizable payment summary template module for allowing the sender to customize format of the payment summary.

3. The system according to claim 1 wherein the plurality of modules further comprising a verification payee account module for verifying identification of the payee's details added through the payee module.

4. The system according to claim 1 wherein the remittance summary module displays a list of customizable categories representing the payment summary.

5. The system according to claim 1 wherein the notification module allows the sender to send the payment summary of each payee to the financial institution to initiate the payments.

6. The system according to claim 5 wherein the plurality of modules further comprising a financial institution module allows the financial institution to process the payments as per the mode selected by the payee in the payee module.

7. The system according to claim 1 wherein the plurality of modules further comprising a reminder module coupled to the notification module to send follow up notification to the payee to select the mode of the payment.

8. The system according to claim 4 wherein the remittance summary module displays a list of categories for allowing a user to select a specific number of the categories.

9. The system according to claim 1 wherein the plurality of modules further comprising an account verification module coupled with the payee module for confirming the payee banking details with details of the payee held by the financial institution.

10. The system according to claim 1 wherein the plurality of modules further comprising a payment status module coupled to the payment process module for sending updates on the status of the payment to the payee via the communication network.

11. The system according to claim 1 wherein the plurality of modules further comprising a registration module for registering at least one of: at least one sender; and at least one payee, on the central server.

12. The system according to claim 1 wherein the plurality of modules further comprising a preferred payment module for analyzing at least one of: phone text messages; and social media accounts, to detect preferred mode of the payment of the payee.

13. The system according to claim 1 wherein the dashboard module allows the sender to check a type of the claims and the summary of the claims.

14. The system according to claim 1 wherein the dashboard module further allows to display payment method activities, allows the sender to search for the payments, and allows the sender to track outgoing payments.

15. A method for communicating with a financial institution over a communication network to manage payments of payee initiated by a sender, the method comprising a steps of:
storing plurality of modules using a database;
monitoring and updating the plurality of modules using a central server;
processing the plurality of modules through a processing unit, wherein the processing unit coupled to the database and the financial institution through the central server;
sending a payment summary by the sender to each payee over the communication network using a notification module;
uploading payee's details by the payee using a payee module in the central server;
selecting a mode of payment using the payee module to receive the payment by the payee;
inputting banking details of the financial institution using the payee module;
reviewing refunds requested by the sender for the payments send to the payee using a dashboard module;
receiving the refunds by the sender of the payment send to the payee using a refunds module;
processing the payment as per the mode selected by the payee in the payee module using a payment process module;
processing the payment via cheque mode if the payee fails to update the mode of the payment in a pre-defined duration; and
displaying a summary of the payments made by the sender to the payee using a remittance summary module.

16. The method according to claim 15 further comprising the steps of:
customizing a format of the payment summary using a customizable payment summary template module; and
displaying a list of customizable categories representing the payment summary.

17. The method according to claim 15 further comprising the steps of:
verifying identification of the payee's details added through the payee module using a verification payee account module;
sending follow up notification to the payee to select the mode of the payment using a reminder module;
confirming the payee banking details with the details of the payee held by the financial institution using an account verification module; and
sending updates on a status of the payments to the payee via the communication network.

18. The method according to claim 15 further comprising the steps of:
sending the payment summary of each payee added through the payee module for the payments to the financial institution using the notification module; and
processing the payments as per the mode selected by the payee in the payee module using a financial institution module.

19. The method according to claim 15 further comprising a step of analyzing at least one of: phone text messages; and social media accounts, to detect preferred mode of the payment of the payee using a preferred payment module.

20. The method according to claim 15 further comprising a step of displaying payment method activities, allows the sender to search for the payments, and allows the sender to track outgoing payments using the dashboard module.

* * * * *